United States Patent [19]

Uemura et al.

[11] 4,267,986

[45] May 19, 1981

[54] MAGNETIC TAPE CASSETTE

[75] Inventors: Noboru Uemura, Odawara; Shunzo Hatakeyama, Ibaragi; Hidehisa Hashimoto, Funabashi, all of Japan

[73] Assignee: TDK Electronics Co., Ltd., Tokyo, Japan

[21] Appl. No.: 59,824

[22] Filed: Jul. 23, 1979

[51] Int. Cl.³ .................. G03B 1/04; G11B 15/32
[52] U.S. Cl. ................................................ 242/199
[58] Field of Search ............ 242/199, 200, 198, 197, 242/194, 71.2; 360/96.1, 93, 132

[56] References Cited

U.S. PATENT DOCUMENTS

| 3,235,264 | 2/1966 | Mikrut | 242/200 X |
| 3,348,786 | 10/1967 | Miller et al. | 242/200 |
| 3,910,692 | 10/1975 | Scibilia | 242/199 |
| 4,006,493 | 2/1977 | Gerry | 360/132 |
| 4,166,593 | 9/1979 | Milants | 242/199 |

Primary Examiner—Leonard D. Christian
Attorney, Agent, or Firm—Seidel, Gonda, Goldhammer & Panitch

[57] ABSTRACT

A magnetic tape cassette comprises a metallic intermediate frame having upper and under flat surfaces in parallel and providing a space large enough to hold a reel of magnetic tape, and a top plate and a bottom plate, both of which are plastic moldings in the form of substantially flat plates fastened together with the intermediate frame along the flat surfaces. The intermediate frame and the both plate have aligning and matching means for precise engagement with one another.

7 Claims, 3 Drawing Figures

MAGNETIC TAPE CASSETTE

BACKGROUND OF THE INVENTION

This invention relates to a magnetic tape cassette, and more specifically to a magnetic tape cassette which is assembled with high accuracy.

Ordinary magnetic tape cassettes have been fabricated by putting a pair of plastic half cases of substantially the same configurations together by machine screws. However, strains produced on molding of the plastic tend to deviate the half cases from the normal mating planes. When the both halves turn aside in the same direction, the two tape tracks on the opposite sides "A" and "B" of the cassette will contact the magnetic head in different manners with a consequent variation in sensitivity. Conversely when the two halves curl in opposite directions, troubles such as irregular tape travel, off-track or out-of-phase recording or play will occur. One of the factors responsible for the molding strains of such half cases is the rather intricate configurations they have. It combines with the thermal and stress deformations of the plastic material itself to develop the undesired strains.

SUMMARY OF THE INVENTION

Therefore, it is a primary object of the present invention to provide a magnetic tape cassette assembled with good accuracy.

Another object of the invention is to provide a magnetic tape cassette with minimized thermal and stress deformations.

Still another object of the invention is to provide a magnetic tape cassette consisting of a metallic intermediate frame sandwiched between plastic half cases and thereby overcome the afore-mentioned difficulties of the prior art.

Yet another object of the invention is to provide, in a magnetic tape cassette consisting of a metallic intermediate frame sandwiched between plastic half cases, means for precisely aligning and matching those components with one another.

A further object of the invention is to provide a magnetic tape cassette having a metallic intermediate frame of a structure which permits exact guiding of the tape.

In accordance with the present invention, the cassette case is made up of three components, one of them being formed of a metal and the two others being plastic moldings, so as to simplify the fabrication process and improve the accuracy of assembly. The plastic components may be made of a transparent material so that the interior construction of the cassette can be seen through to observe the movement of the magnetic tape from the outside. The transparency will also add to the refinement of the design.

DESCRIPTION OF THE INVENTION

Figure 1:
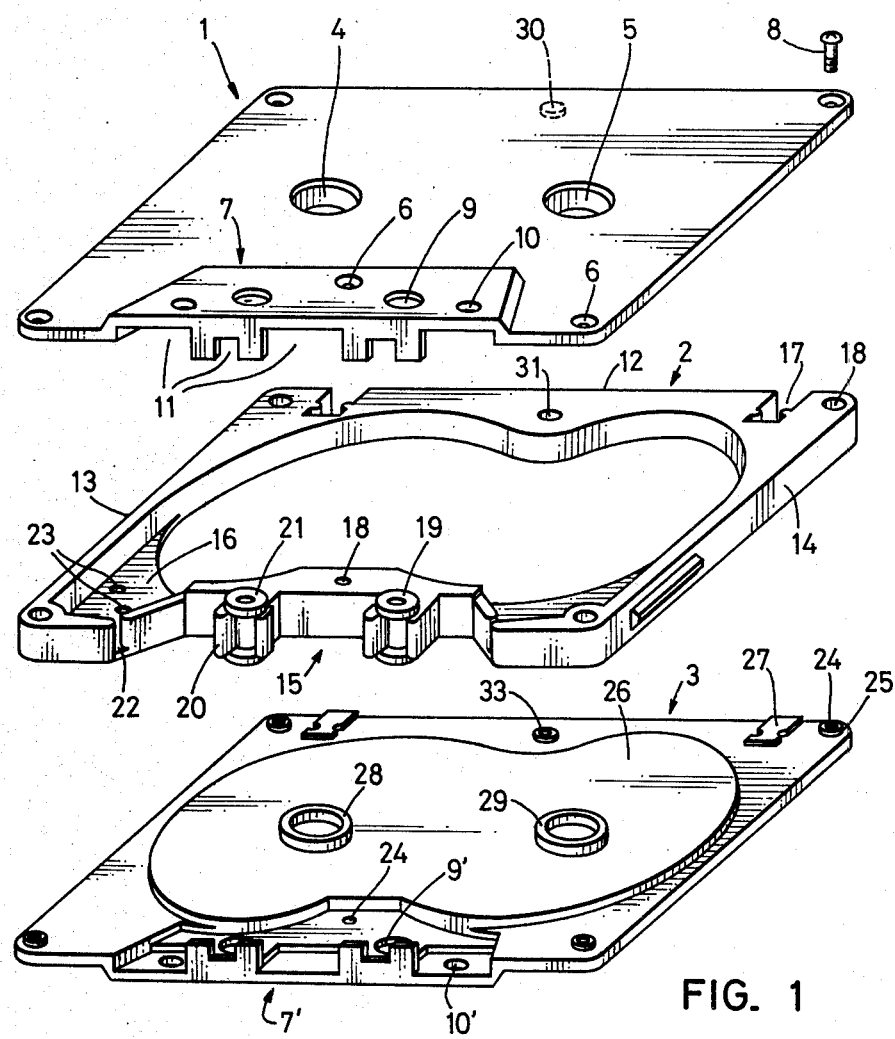
FIG. 1 is an exploded view of a magnetic tape cassette embodying the invention.

Referring now to FIG. 1, which is an exploded view, a magnetic tape cassette of the invention is shown comprising a top plate 1, an intermediate frame 2, and a bottom plate 3, in the descending order. The top and bottom plates 1, 3 are formed of a plastic, preferably of a transparent type. The upper surface of the top plate 1 and the under surface of the bottom plate 3 are substantially of the same shape and size as those of the existing standard products. The intermediate frame is a support frame made of a metal (aluminum in particular) by die-casting and having upper and under surfaces which are flat and parallel to each other.

The top plate 1 is in the form of a generally flat plate having a pair of holes 4, 5 formed in spaced relation in the center to receive shafts for driving tape hubs. These holes are tapered so that their inlet ends are larger in diameter than the outlet ends. Countersunk holes 6 are formed in the four corners of the rectangular plate and in a bulge 7 in the upper surface to receive machine screws 8 for fastening the plate and the two other members together. The bulge 7 is formed with a pair of capstan holes 9, which serve also as aligning and matching means at the time of assembling, and guide pin holes 10. Along its outer edge the bulge has projections normal to its plane, defining windows 11 to be associated with the tape head, guides, and magnetic tape. These holes and windows 9, 10, and 11 are all formed in standardized locations. At a rear middle point of the under surface of the top plate is formed a lug 30 for precise alignment of the plate with the intermediate frame.

Figure 3:
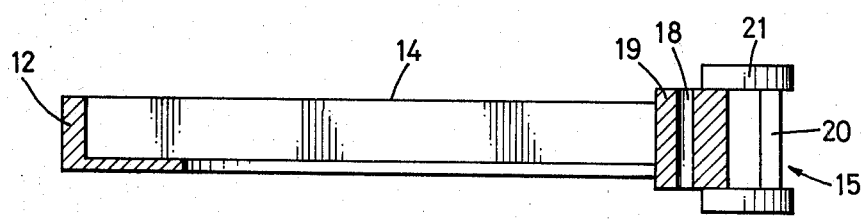
FIG. 3 is a sectional view looking in the direction of arrows A—A of FIG. 2.
Figure 2:
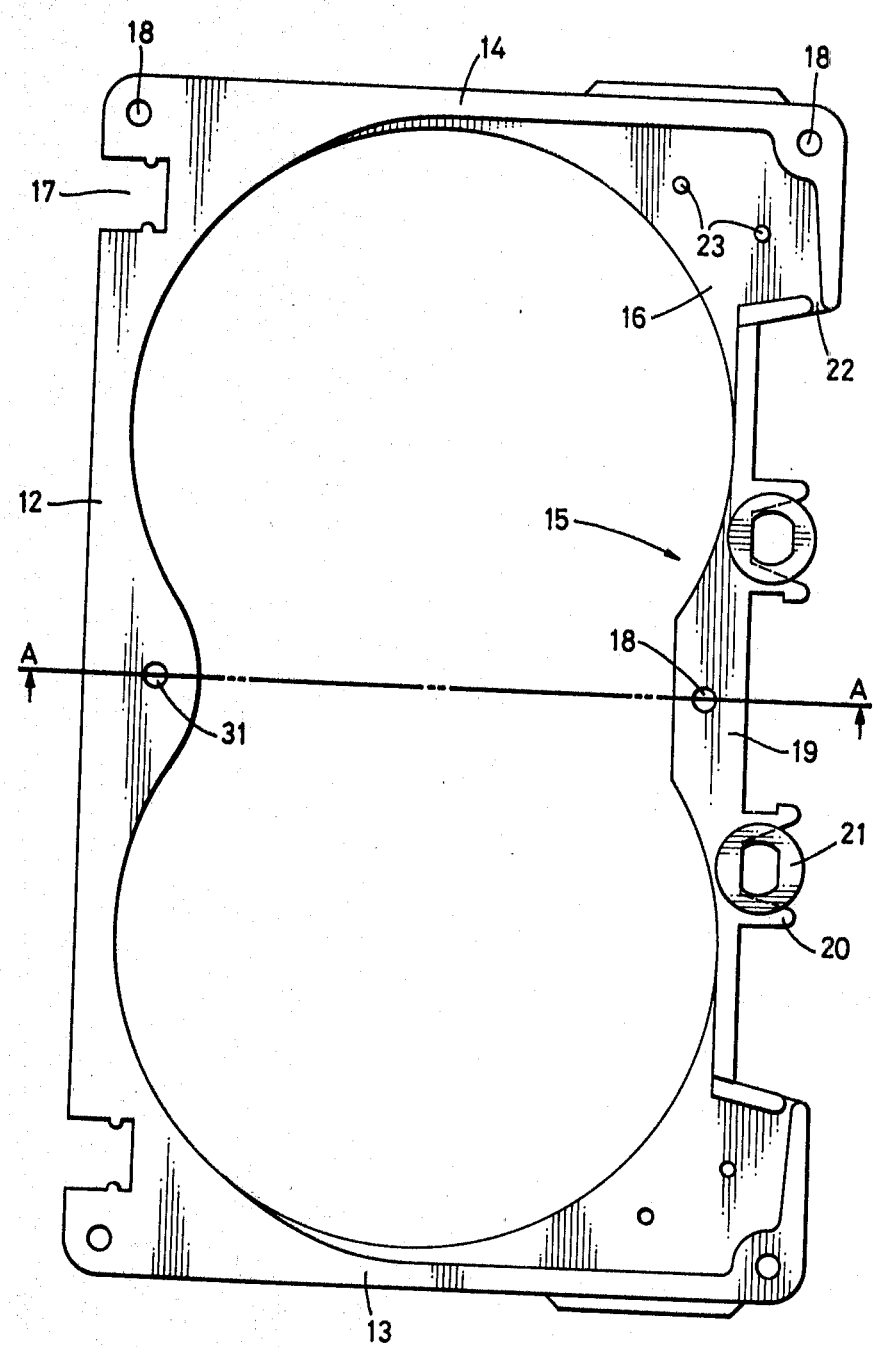
FIG. 2 is a plan view of an intermediate frame of the invention.

The intermediate frame 2 is shown with exact dimensions on an enlarged scale in FIGS. 2 and 3. It is die-cast from aluminum, for example. Roughly rectangular in shape to provide a space for holding a reel of magnetic tape it consists of a long side portion 12, two short side portions 13, 14, and a front side portion 15. The long and short side portions extend with the both upper and under surfaces in parallel planes. The both ends of the front portion 15, too, have upper and under surfaces extending in the same parallel planes. As can be seen from FIG. 2, thin webs 16 extend inwardly from the under surfaces of the both front corners where the side portions 13, 14 meet the both ends of the front portion. With these webs the frame forms a large center opening in an epitrochoid form, with two circles drawn about the driving shaft holes of the top and bottom plates 1, 3 and the overlapping portions rounded or otherwise smoothly connected. The webs provide reinforcements for the thin portions of the intermediate frame and generally match the frame with the bottom plate 3. The under surfaces of the webs 16 are flush with those of the side portions. Near the both ends of the long side portion 12 are formed a pair of recesses 17, to which tabs to avoid unintentional erasing of the recorded program or information is to be attached. Through all corners of the side portions are also formed loose holes 18 corresponding to the countersunk holes 6 of the top plate 1.

The middle portion of the front side portion 15, which corresponds to the bulge 7 of the top plate 1, has a part 19 thicker than the rest. The parallel upper and under surfaces of this part constitute support faces to contact the inner surfaces of the bulges of the top and bottom plates 1, 3. The thick walled part 19 is also formed with a loose hole 18. As has been indicated with the bottom plate 3, the manner in which the under support face of the part 19 contacts the underlying surface will be obvious to those skilled in the art. From the front face of the thick-walled part 19 extend bifurcated guide projections 20 which terminate with vertical forward edges. Rings 21 are formed integrally with the upper and lower ends of the projections to provide positive guide means for the magnetic tape. Because two such bifurcated guide projections 20 are provided, they support the magnetic tape at four points and, made of a metal to exact dimensions, they guide the tape precisely. The rings 21 have holes to receive a capstan the outside diameter being such that the rings fit exactly in the holes 9, 9' of the top and bottom plates. The front side portion 15 includes slots 22 formed near the both ends for the passage of magnetic tape. Blind holes 23 to support one ends of shafts of guide rollers are formed in the webs 16, close to the slots 22. Although not shown, the top plate also has blind holes at points corresponding to the holes 23. The long side portion 12 has a through hole 31 formed in alignment with the lug 30 of the top plate for precise engagement, the lower half of the hole allowing an upwardly protruding lug 33 of the bottom plate to fit in exactly.

Like the top plate 1, the bottom plate 3 is a substantially flat member of a clear plastic. At the four corners and in the center of the bulge 7' of the bottom plate are formed screw holes 24 aligned with the countersunk holes 6 of the top plate and the loose holes of the intermediate frame. Where necessary, the surrounding walls of these screw holes at the corners may be projected in the form of rings 25, which will fit in annular recesses (not shown) formed around the corresponding loose holes of the intermediate frame 2 for the purposes of guiding and, to some degree, of alignment. Protuberances 27 are also formed on the bottom plate, at points where they fit in the recesses 17 to be provided with the erase-proofing tabs. In addition, there is formed a land 26 corresponding in shape to the epitrochoidal center opening of the intermediate frame. Through holes 28, 29, which face, respectively, the holes 4, 5 of the top plate 1, have on their upper ends annular collars into each of which the hub of tape reel (not shown) is to be loosely inserted. It should be noted that the inner ends of the holes 4, 5 of the top plate, too, are provided with similar annular collars. The front side portion 7' is substantially the reverse in configurations to the front portion 7 of the top plate, and its exterior structure may be regarded as identical with that of the top plate shown in FIG. 1. Conversely, the interior structure of the front portion of the top plate may be deemed the same as that of the front portion 7' of the bottom plate.

With the construction described, the components are assembled together in the following way. Hubs on which magnetic tape is wound are fitted around the holes 28, 29 of the bottom plate, and the intermediate frame is placed on the bottom plate, when the two components are accurately aligned because the rings 21 fit in the holes 9' and the upright tab 33 fitly engages the matching hole 31. Next, the top plate 1 is put on the upper surface of the intermediate frame, when the two are precisely aligned by guide means, that is, as the rings 21 fit in the holes 9 and the lug 30 in the matching hole 31. Machine screws 8 are then inserted into the holes and tightened to align and assemble the three components together. Any molding strain or other deformation the top and bottom plates may have will be corrected by the flat upper and under surfaces of the intermediate frame, and the two plates will be kept in a perfectly parallel relation. Moreover the metallic intermediate frame permits the cassette to retain proper dimensional stability against thermal, mechanical, and other impacts which may be given from the outside.

According to the present invention, a magnetic tape cassette is obtained which is improved in accuracy of assembly and has no variation in sensitivity but increased tape running stability. There is no off-track or out-of-phase recording or play. Use of clear top and bottom plates permits direct observation of the tape being paid out and taken out, gives a mechanically sophisticated outward appearance, and furthermore, the simple structure of the both plates reduces the development of strains to a minimum.

What we claim is:

1. A magnetic cassette comprising a rectangular metallic intermediate frame, said frame having a long rear portion and a pair of shorter side portions, said frame having a front portion and a pair of reinforcing webs connecting the adjacent ends of the side portions and said front portion; said rear portion, said side portion and a part of said front portion having common top and bottom flat surfaces in parallel, the bottom surface of said webs being flush with said bottom flat surface; the inner walls of said rear, sides and front portions and the upper surface of said webs defining a cassette tape-containing space; a top plate and a bottom plate each of a plastic material in the form of substantially flat plates, means fastening said plates together with said intermediate frame there between along said top and bottom flat surfaces to thereby close said space; and means for aligning said intermediate metallic frame with said top and bottom plates, said aligning means including an opening in said frame, said opening being defined by said inner walls and the inner edges of said webs, and a land formed on one of said plates, said land being fitted within said opening.

2. A cassette in accordance with claim 1 wherein said land is disposed on and forms part of said bottom plate, the upper surface of said land being substantially flush with the upper surface of said webs.

3. A cassette in accordance with claim 1 or 2 wherein said aligning means includes rings on the top and bottom surfaces of said intermediate metallic frame, said plates having mating holes, said rings cooperating with said mating holes in said top and bottom plates.

4. A cassette in accordance with claim 1 wherein said metallic intermediate frame further includes a pair of guides in the form of bifurcated projections extending forwardly of said frame for contact with a magnetic tape, vertical forward edges of said projections providing guide means for the tape.

5. A cassette in accordance with claim 4 wherein the upper surface of said land is on said bottom plate and substantially flush with the upper surface of said webs.

6. A cassette in accordance with claim 5 wherein said aligning means also includes rings on the top and bottom surfaces of said intermediate metallic frame, said rings cooperating with mating holes formed in said top and bottom plates.

7. A magnetic tape cassette which comprises: a rectangular metallic intermediate frame having a long rear portion, a pair of shorter side portions and a front portion; said rear portion, said side portions and a part of said front portion having parallel top and bottom flat surfaces; the inner walls of said rear, sides and front portions defining a cassette tape-containing opening which extends through said frame; said opening corresponding generally to the shape of the numeral 8; a top plate and a bottom plate of a plastic material in the form of substantially flat plates fastened to opposite surfaces of said intermediate frame to close one side of said cassette tape-containing opening; means for aligning said intermediate metallic frame with respect to each of said top and bottom plates, said means including a land formed on said bottom plate and fitted in said opening, the height of said land being less than the thickness of said frame; said land having first and second means for alignment with tape hubs.

* * * * *